Patented June 17, 1947

2,422,321

UNITED STATES PATENT OFFICE 2,422,321

METHOD OF MAKING NITROGENATED CEPHALIN

Edward Trueger, Roselle, N. J., and Basil Sheldon Sprague, Brooklyn, N. Y., assignors to American Lecithin Company, Cleveland, Ohio, a corporation of Ohio No Drawing. Application December 4, 1943,
Serial No. 512,970

3 Claims. (Cl. 260—403)

This invention relates generally to the art of phosphatides and more particularly to new and improved phosphatide compositions of special value as additives to mineral lubricating oils and greases, improved oils containing them, and to a new and improved method of making such compositions.

Mineral lubricating oils and greases tend to deteriorate or decompose under certain severe operating conditions to which they are often subjected in use, for example, in internal combustion engines, electric motors, high pressure bearings and the like. They deteriorate by being oxidized with the resultant formation of corrosive acids which corrode certain metals and alloys, particularly bearing metal containing cadmium-silver or copper-lead alloys. Such corrosion may be of critical importance where high strength alloys are required to carry heavy loads. They may also deteriorate or decompose by being cracked, or oxidized, and then polymerized with resultant increase of viscosity or formation of resinous compounds, or both. Excessive wear of engine parts, loss of engine power and the sticking or freezing of metal parts, such as rings in piston ring grooves, and increased costs of engine operation and maintenance may result from these increases in viscosity or formations of resinous compounds.

Various efforts have been made heretofore to increase the resistance of lubricating oils and greases to deterioration or decomposition when subjected to severe operating conditions. These efforts have included the use of additives, that is, compounds which were added to the oils and greases and which consisted of phenols, halogenated materials, phosphorous compounds, certain amines, metallic compounds and commercial soybean lecithin. However, so far as we know, none of these additives has been entirely satisfactory.

The present invention is predicated on the discovery that reaction products of organic nitro compounds with phosphatides comprising or containing cephalin possess superior properties as additives to mineral lubricating oils for inhibiting oxidation and detergency, as compared with commercial soybean lecithin. This invention contemplates the preparation of compositions containing such reaction products, the process of preparing such products or compositions, and lubricants containing such product or compositions.

Briefly stated, the reaction products or compositions of this invention may be made by reacting cephalin or a phosphatide containing cephalin with a suitable organic nitro compound and then separating and recovering the reaction product. A preferred procedure, stated in some detail, is as follows: The cephalin (alcohol insoluble) fraction of commercial soybean lecithin is dissolved in diethyl Cellosolve, 2-nitrobutanol-1 is added to the solution in the ratio of 15 parts to 50 parts of cephalin and the mixture is refluxed for 2½ hours at about 130° C. The water of reaction is removed by azeotropic distillation since the solvent is immiscible with water, and the solvent is removed by vacuum distillation. Acetone is added to the resulting liquid residue and precipitates material which is cephalin-like and may comprise unreacted cephalin. This precipitate may be recovered and used for certain purposes for which cephalin is suitable. After removal of the precipitate, the acetone is removed by vacuum distillation and the residue is a liquid which, as compared with the dark red 2-nitrobutanol-1, is darker in color and more viscous and has a less pungent odor. This liquid contains phosphorous and an amount of nitrogen which indicates that nitrogen has been added to that present in the starting cephalin, is neutral or slightly acid, and is believed to be cephalin combined with added nitrogen. The amount of this liquid is considerably greater than the amount of the nitro compound which is added to the cephalin solution, approximating 146% of that compound.

It will be understood by those skilled in the art that many variations in the foregoing preferred procedure may be made. For example, commercial soybean lecithin containing cephalin may be substituted for the cephalin (alcohol insoluble) fraction of commercial soybean lecithin mentioned above and the alcohol insoluble fraction may be made by a procedure other than that described in copending application Ser. No. 501,177.

Similarly, solvents for the cephalin other than diethyl Cellosolve may be employed, such as n-butyl ether or a mixture of n-butyl ether and i-propyl ether. The solvent for the cephalin should be immiscible with water and when it is so immiscible the water of reaction may be removed by azeotropic distillation.

Likewise, nitro compounds other than 2-nitrobutanol-1 may be employed. In general, it may be said that any aliphatic or aromatic nitro compound may be used which has an alcohol, aldehyde, halogen or unsaturated group which will react with cephalin to give the same type of nitrated cephalin as that produced when the nitrobutanol is employed.

Also, the proportions of cephalin and the nitro compound may be varied, as well as the time and temperature of reaction. The reaction temperature should not exceed 170° C. and preferably should be below about 130° C.

We prefer that both the cephalin starting material and the nitro compound should be dry before they are reacted, altho satisfactory results may be obtained without first drying the reacting materials. The cephalin (alcohol insoluble) fraction of commercial soybean lecithin may be dried by dissolving it in a suitable solvent which is immiscible with water, and then heating and removing the water by azeotropic distillation. The nitro compound, especially 2-nitrobutanol-1, may be purified somewhat by distillation under vacuum and may then be dried with anhydrous calcium sulfate.

Cephalin compositions embodying the present invention exhibit marked efficiencies as additives to mineral lubricating oils and greases, as is shown by the following comparative results which were obtained by subjecting an SAE-30 solvent refined Mid-Continent oil without additives, and with various percentages of the additives of this invention, to a 65 hour "Sohio" oxidation test.

|  | Oil without Additives | Oil with present cephalin additives, per cent by weight | | |
|---|---|---|---|---|
| Concentration, Wt. per cent | | 0.2 | 0.5 | 1.0 |
| Naphtha Insoluble mgs./gms. oil | 366.2 | 99.4 | 12.6 | 10.2 |
| Chloroform Insoluble mgs./gms. oil | 107.8 | 23.9 | 6.7 | 7.2 |
| Per cent Increase in Vis. at— | | | | |
| 100° F | 103.5 | 50.4 | 19.2 | 14.2 |
| 210° F | 45.0 | 27.1 | 11.5 | 12.2 |
| Neutralization No | 2.0 | 1.5 | 0.5 | 0.67 |
| Varnish Rating | 7 | 3 | 1 | 1 |
| Detergency Rating | 8 | 8 | 3 | 2 |
| Loss in wt. of Metal strip, mgs./dcm. | 1.10 | 0.63 | 0.24 | 0.3 |

The "Sohio" oxidation test above mentioned comprises the blowing of air at a constant rate thru a lubricating oil while it is maintained at an elevated temperature and while two low carbon steel tubes and a copper strip are immersed in the oil. The standard conditions of that "Sohio" test are as follows:

Temperature _____ °F__ 325
Volume of oil _____ cc__ 250
Air rate _____ liters per hr__ 30
Area of steel _____ sq. cm__ 300
Area of copper _____ sq. cm__ 20
Time, variable.

The foregoing test results demonstrate the marked improvement in the oil which contained the cephalin material of this invention over that of the oil which did not contain any of that material.

The foregoing test results show that the improvement in the oil increased as the amount of cephalin material of this invention was increased from .2% to 1.0%. Higher percentages of this material may be employed in some cases if desired, for example, up to about 5% with some improvement over the results obtained with 1%.

Having thus described the invention so that others skilled in the art may be able to understand and practice the same, we state that what we desire to secure by Letters Patent is defined in what is claimed.

What is claimed is:

1. The herein described process which comprises the steps of reacting a cephalin-containing vegetable phosphatide with 2-nitrobutanol-1 at a temperature between about 130° C. and about 170° C., and recovering the acetone soluble reaction product.

2. The herein described process which comprises the steps of dissolving cephalin in a solvent immiscible with water, reacting the dissolved cephalin with 2-nitrobutanol-1 at a temperature between about 130° C. and about 170° C., removing the water of reaction and removing the solvent, extracting the resulting residue with acetone, separating and recovering the cephalin-like, acetone insoluble part of the residue, and separating and recovering the product of reaction of cephalin with 2-nitrobutanol-1 from the acetone soluble part of the residue by distilling off the acetone under vacuum.

3. The herein described process which comprises the steps of dissolving dried cephalin in a solvent immiscible with water, adding dried 2-nitrobutanol-1 to said solution in the ratio of 15 parts to 50 parts of the latter, refluxing the resulting mixture for about 2½ hours at a temperature of about 130° C., removing the water of reaction by azeotropic distillation, removing the solvent by vacuum distillation, extracting the resulting residue with acetone, separating and recovering the cephalin-like, acetone insoluble part of the residue, and separating and recovering the product of reaction of cephalin and 2-nitrobutanol-1 from the acetone soluble part of the residue by distilling off the acetone under vacuum.

EDWARD TRUEGER.
BASIL SHELDON SPRAGUE.

REFERENCES CITED

The following references are of record in the file of this patent:

UNITED STATES PATENTS

| Number | Name | Date |
|---|---|---|
| 2,066,173 | Calcott | Dec. 29, 1936 |
| 2,271,410 | Thurman | Jan. 27, 1942 |
| 2,272,616 | Thurman | Feb. 10, 1942 |
| 2,249,002 | Julian | July 15, 1941 |

FOREIGN PATENTS

| Number | Country | Date |
|---|---|---|
| 455,304 | Great Britain | Oct. 19, 1936 |

OTHER REFERENCES

Jour. Dairy Science, 11 (1928), pages 429–435. Note particularly pages 431–2. (Sci. Lib.) 260–403.